United States Patent
Krefta et al.

(10) Patent No.: US 6,577,097 B2
(45) Date of Patent: Jun. 10, 2003

(54) METHOD AND SYSTEM FOR CONTROLLING A SYNCHRONOUS MACHINE USING A CHANGEABLE CYCLE-CONDUCTION ANGLE

(75) Inventors: Ronald John Krefta, Noblesville, IN (US); Tillasthanam V. Sriram, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/928,613

(22) Filed: Aug. 13, 2001

(65) Prior Publication Data

US 2003/0034755 A1 Feb. 20, 2003

(51) Int. Cl.$^7$ ................................ H02P 7/42; H02P 1/46
(52) U.S. Cl. ...................... 318/801; 318/254; 318/85; 318/700
(58) Field of Search .................... 318/41–49, 801, 318/700, 85, 625, 254, 138; 360/78

(56) References Cited

U.S. PATENT DOCUMENTS

| | | | |
|---|---|---|---|
| 3,908,130 A | | 9/1975 | Lafuze |
| 5,298,839 A | | 3/1994 | Takeda |
| 5,773,964 A | * | 6/1998 | Peter ............................ 322/20 |
| 6,002,219 A | | 12/1999 | Permuy |
| 6,400,107 B1 | * | 6/2002 | Nakatani et al. ............ 318/254 |

FOREIGN PATENT DOCUMENTS

JP  10341594 A  * 12/1998  ............ H02P/7/63

* cited by examiner

Primary Examiner—Jonathan Salata
Assistant Examiner—Patrick Miller
(74) Attorney, Agent, or Firm—Margaret A. Dobrowitsky (57) ABSTRACT

Method and system for controlling a synchronous machine including a polyphase stator are provided. The machine may be used in a piece of equipment respectively as a generator and as a motor for starting an engine in the piece of equipment. The method allows to sense rotor position of the machine using a sensor assembly configured to supply a respective stream of pulses indicative of rotor position relative to each phase of the machine. The method further allows to process each stream of pulses from the sensor assembly to generate a first set of inverter control signals. The first set of inverter control signals is applied to an inverter circuit coupled to energize the phases of the stator to start the machine. The first set of control signals is configured to provide a first cycle-conduction angle relative to the zero-crossings of the respective phase EMF voltages of the machine to produce a sufficiently high level of torque during start of the machine. Upon the rotor reaching a predefined rotor speed value, each stream of pulses from the sensor assembly is processed to generate a second set of inverter control signals. The second set of inverter control signals is applied to the inverter circuit to energize the phases of the stator. The second set of control signals is configured to provide a second cycle-conduction angle relative to the zero-crossings of the respective phase EMF voltages of the machine to enable a sufficiently high rotor speed and thus facilitate the occurrence of a successful cranking event for the engine of the piece of equipment.

17 Claims, 4 Drawing Sheets

METHOD AND SYSTEM FOR CONTROLLING A SYNCHRONOUS MACHINE USING A CHANGEABLE CYCLE-CONDUCTION ANGLE

BACKGROUND OF THE INVENTION

The present invention is generally related to control of electrodynamo machines, and, more particularly, to system and method for controlling a synchronous machine using a changeable cycle-conduction angle.

Propulsion drive systems for self-propelled pieces of equipment, including electric vehicles or hybrid electric vehicles, need to have a relatively wide speed range, high torque per ampere, high efficiency, quick dynamic response, and operational robustness and reliability under tough environmental or operational conditions.

Synchronous machines are commonly used in a large variety of applications, including automotive applications. For example, the automotive generator is commonly a "Lundell" type wound-field synchronous machine. Its traditional application has been as a generator for charging the vehicle battery and providing 12V accessory power in the vehicle. This is accomplished by connecting the generator's stator windings to a three phase diode rectifier. The rectified DC output is fed to the battery. An electronic regulator controls the excitation current to control the rectified DC output voltage from the diode bridge.

Figure 1:
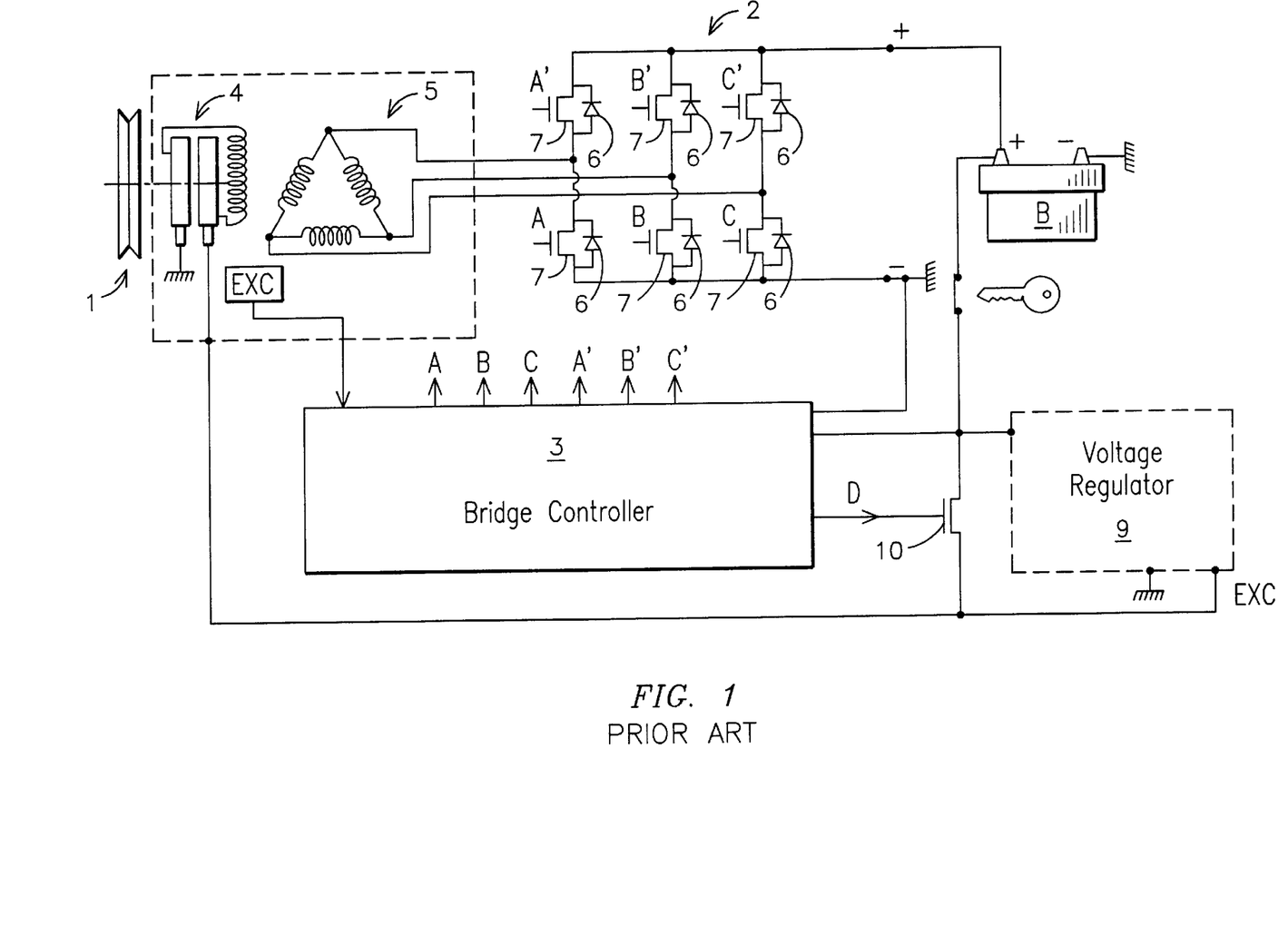
FIG. 1 illustrates a circuit diagram of a prior art electrodynamo machine used both as a generator and as a motor for starting the engine of a self-propelled vehicle.

It is known that such a machine can also be used as an electric starter motor (or cranking motor) of the internal combustion engine in the vehicle, assuming the diode bridge is replaced with an active semiconductor bridge, typically comprised of metal oxide semiconductor field effect transistors (MOSFETs). In this configuration, the electric machine can perform the role of both a cranking motor as well as a vehicle electric generator. FIG. 1 described below is illustrative of one known implementation.

FIG. 1 shows a three-phase electrodynamo machine 1. FIG. 1 further shows a circuit, such as a control and rectifier bridge circuit 2, and a unit 3 for controlling the bridge circuit 2. In conventional manner, the machine 1 includes: a coil-carrying rotor 4 constituting the primary magnetic circuit associated with the rings and brushes that convey excitation current (of the order of a few amps); and a polyphase stator 5 carrying a plurality of coils constituting the secondary magnetic circuit, connected in star or delta configuration in the common case of a three-phase structure and acting, during generator operation, to deliver converted electrical power to the rectifier bridge 2 (several tens of amps at a voltage of the same order as the battery voltage).

The bridge circuit 2 is connected to the various phases of the secondary magnetic circuit 5 and is connected between ground and a power supply terminal of the battery B of the vehicle. It is constituted by a plurality of diodes 6 forming a rectifier bridge, and also by a plurality of upper and lower switching devices 7, such as MOSFETs, that are connected in parallel with respective diodes 6 and control the various phases of the machine. In motor mode, the diodes act as freewheel diodes, whereas in generator mode, they act as a rectifier bridge. The MOSFET can also be energized during generation to conduct backwards. This mode of operation is commonly referred to as synchronous rectification and generally increases the converter efficiency with the FET body and diode conducting in parallel. The motor mode operation of such a machine is achieved by applying DC field excitation current to the primary magnetic circuit 4 and by delivering signals that are phase-shifted by 120 degrees to the phases of the stator.

In order to produce continuous torque for motoring, a position sensor is provided to synchronize the energization of the phase windings with the rotation of the machine. In its simplest form, for a three-phase machine this sensor is comprised of three position sensors that are spatially located 60 or 120 electrical degrees from another. This arrangement is commonly utilized in the control of brushless DC permanent magnet machines (BDCPM). One mode of machine excitation that has been typically used in BDCPM machines is 120 degree conduction. That is, a cycle-conduction mode wherein each of the six upper and lower inverter switching devices conducts for 120 electrical degrees per cycle. This conduction mode is known to result in the highest machine torque per ampere (amp) ratio under most circumstances. Another mode of machine excitation typically used is 180 degree conduction, or six-step excitation. That is, a. cycle-conduction mode where each of the six inverter devices for a three-phase machine conducts for 180 electrical degrees per cycle. Machines driven with 180 degree excitation generally have a lower torque per amp ratio than those with 120 degree excitation, and hence have a higher no-load speed. Unfortunately, it is believed that present control techniques for electrodynamo machines used in automotive equipment both as a generator, and as a motor for starting an engine mechanically coupled to the machine, have failed to recognize that one could appropriately combine the advantageous torque characteristics provided by the 120 degree excitation with the higher no-load speeds provided by the 180 degree excitation in order to quickly and reliably facilitate occurrence of a succesful cranking event, even under demanding environmental and operational conditions.

In view of the foregoing isssues, it is desirable to provide synchronous machine control techniques that start the machine in a first mode of cycle-conduction that enables the machine to overcome the frictional and compressive forces of the internal combustion engine coupled to the starter system. Upon the machine reaching a desired speed, it would be further desirable to switch to a second mode of cycle-conduction that improves the no-load speed performance of the machine. It would be further desirable to be able to quickly and reliably start and control the machine without resorting to complex control algorithms, expensive sensors or without having to perform burdensome hardware modifications to the machine.

BRIEF SUMMARY OF THE INVENTION

Generally, the present invention fulfills the foregoing needs by providing in one aspect thereof a method for controlling a synchronous machine including a polyphase stator. The machine may be used in a piece of equipment respectively as a generator and as a motor for starting an engine in the piece of equipment. The method allows to sense rotor position of the machine using a sensor assembly configured to supply a respective stream of pulses indicative of rotor position relative to each phase of the machine. The method further allows to process each stream of pulses from the sensor assembly to generate a first set of inverter control signals. The first set of inverter control signals is applied to an inverter circuit coupled to energize the phases of the stator to start the machine. The first set of control signals is configured to provide a first cycle-conduction angle relative to the zero-crossings of the respective phase EMF voltages of the machine to produce a sufficiently high level of torque during start of the machine. Upon the rotor reaching a predefined rotor speed value, each stream of pulses from the sensor assembly is processed to generate a second set of inverter control signals. The second set of inverter control signals is applied to the inverter circuit to energize the phases of the stator. The second set of control signals is configured to provide a second cycle-conduction angle relative to the zero-crossings of the respective phase EMF voltages of the machine to enable a sufficiently high rotor speed and thus facilitate the occurrence of a successful cranking event for the engine of the piece of equipment.

The present invention further fulfills the foregoing needs by providing in another aspect thereof a system for controlling a synchronous machine including a polyphase stator. The system includes a sensor assembly configured to supply a respective stream of pulses indicative of rotor position relative to each phase of the machine. The system further includes a processor configured to process each stream of pulses from the sensor assembly to generate a first set of inverter control signals. An inverter circuit is coupled to receive the first set of inverter control signals and energize the respective phases of the stator to start the machine. The first set of control signals is configured to provide a first cycle-conduction angle relative to the zero-crossings of the respective phase EMF voltages of the machine to produce a sufficiently high level of torque during start of the machine. Upon the rotor reaching a predefined rotor speed value, the processor is configured to process each stream of pulses from the sensor assembly to generate a second set of inverter control signals. The second set of control signals is configured to provide a second cycle-conduction angle relative to the zero-crossings of the respective phase EMF voltages of the machine to enable a sufficiently high rotor speed and thus facilitate the occurrence of a successful cranking event.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
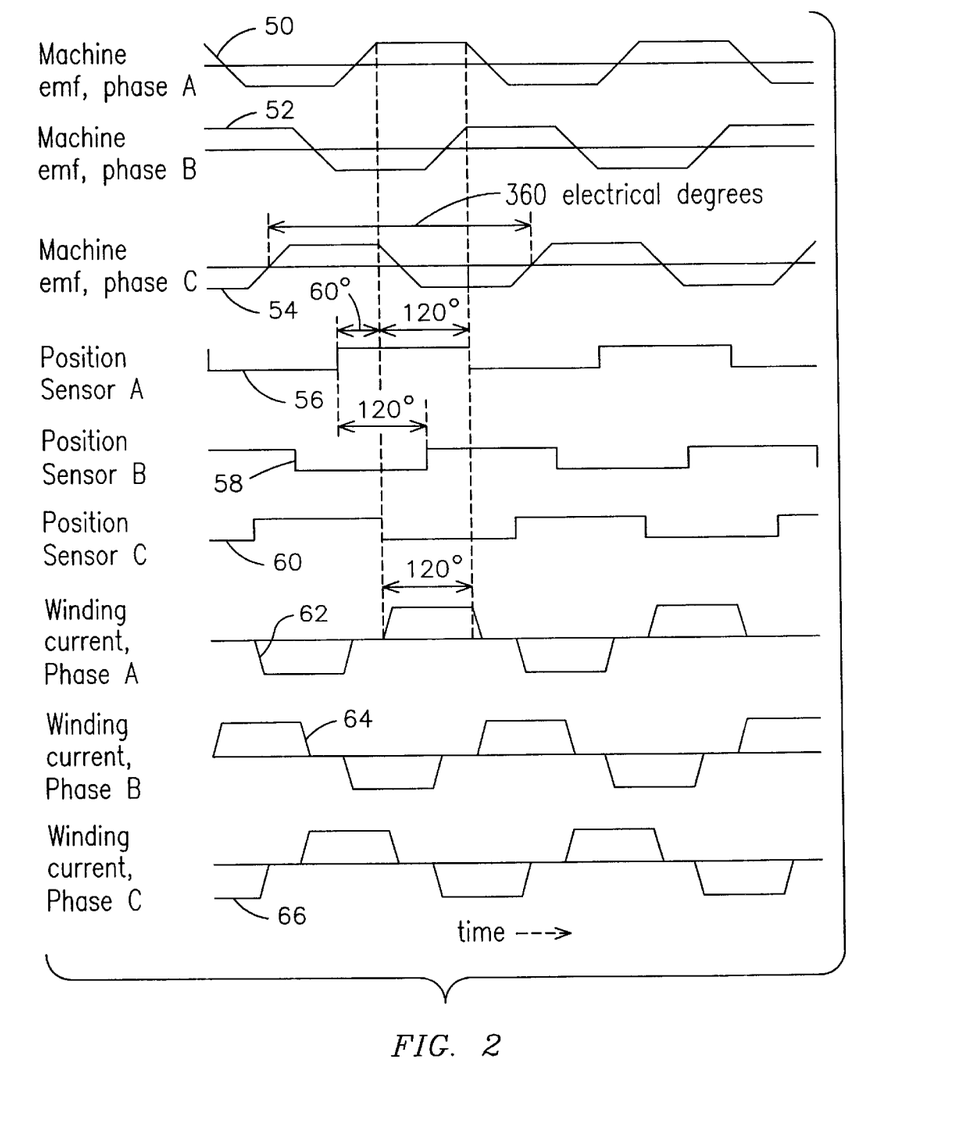
FIG. 2 illustrates exemplary signal plots corresponding to a first cycle-conduction angle (e.g., 120°) for starting a synchronous machine in accordance with one aspect of the present invention.
Figure 4:
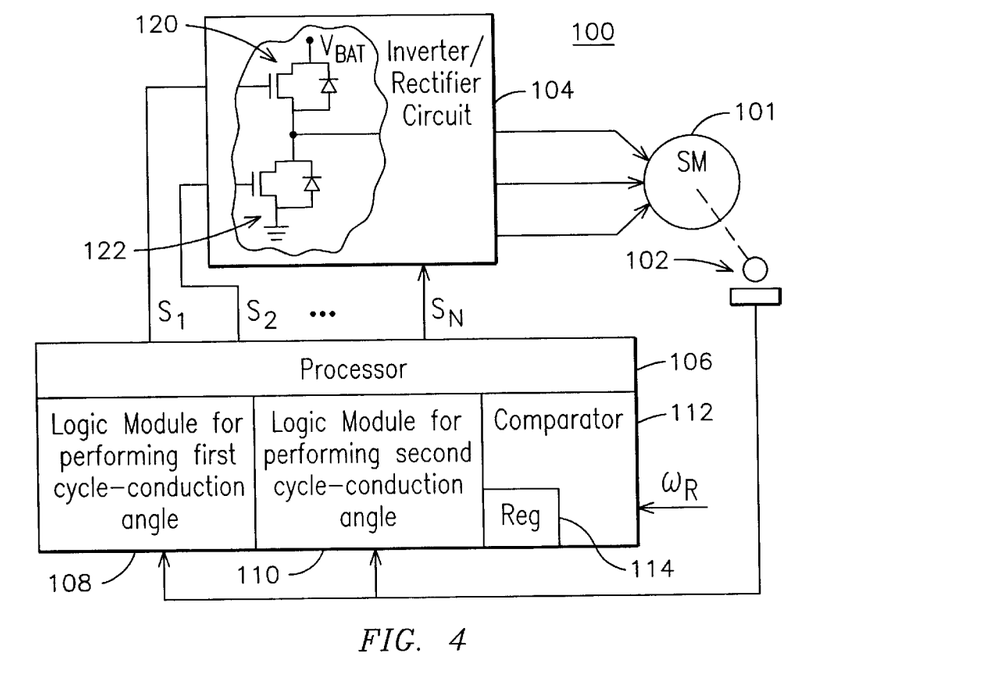
FIG. 4 illustrates an exemplary schematic of a system including a processor embodying aspects of the present invention.

FIG. 2 illustrates exemplary signal plots corresponding to a cycle-conduction angle of about 120 degrees. More particularly, FIG. 2 illustrates respective electromotive force (EMF) voltage signals for each phase of a three phase synchronous machine 101 (FIG. 4). In FIG. 2, the EMF voltage signals are respectively identified by the reference numerals 50, 52 and 54. FIG. 2 further illustrates signals 56, 58 and 60, such as may be generated by a sensor assembly 102 (FIG. 4), each representative of a respective stream of pulses indicative of rotor position relative to each phase of the machine. In one exemplary embodiment, sensor assembly 102 comprises three sensors spaced 120 or 60 electrical degrees from one another. Examples of sensors that may be used for sensing rotor position include Hall-effect sensors, magneto-resistive sensors, encoders and optical sensors. As suggested above, it will be appreciated that the sensor assembly 102 is not limited to three sensors and the spatial positioning of the sensors is not limited to 120 or 60 electrical degrees since the techniques of the present invention can be utilized with polyphase machines having more or less than three phases.

FIG. 2 further illustrates exemplary phase currents 62, 64 and 66 that are produced by the machine when energized by an inverter circuit 104 (FIG. 4) (or rectifier circuit in the generating mode) in response to control signals corresponding to the signal sequence of FIG. 2. It will be appreciated that the generally trapezoidal current in each phase is non-zero for a total of about 240 electrical degrees per cycle, that is, 120 degrees for positive current, and 120 degrees for negative current. As suggested above, this mode of operation generally provides relatively high machine torque per ampere. Those skilled in the art will recognize that the timing of the energizing phase currents may be advanced by some electrical angle resulting in a greater machine torque, often referred to as phase advance or field weakening. The value of the phase angle to maximize torque production will vary as a function of speed. One may note in FIG. 2 that the trapezoidal currents are generated during the cycle portion where the EMF signals reach their respective peak levels, both positive and negative. Since the amount of torque produced by the machine is directly proportional to the product of EMF voltage and current, it will be intuitively appreciated from the phase and magnitude interrelationship of the exemplary voltage and current signals illustrated in FIG. 2 as to why the 120 degree conduction mode generally results in a relatively high torque/amp ratio. This can be also appreciated in the machine speed/torque plots illustrated in FIG. 5.

The inverter device gating or control signals can be derived with straightforward logic from the signals 56, 58 and 60. For example, in the exemplary embodiment shown in FIG. 2, the gating or inverter control signals for the A-Phase upper and lower switching devices 120 and 122 (FIG. 4) in inverter circuit 104, connected to generate the exemplary A-Phase current 62, would be derived from the A and C-Phase position sensors that supply the stream of pulses 56 and 60 respectively. More specifically, such logic could be represented in Boolean logic for the A-phase upper switching device 120 as $A\overline{C}$ for generating the positive portion of the A-phase current while the gating signals for the A-phase lower switching device 122 could be represented as $\overline{A}C$ for generating the negative portion of the A-Phase current. To put it another way, one can see in FIG. 2 that logic $A\overline{C}$ allows to mask the first 60 electrical degrees of the pulse stream from the phase A sensor while logic $\overline{A}C$ allows to mask the last 60 electrical degrees of the pulse stream from the phase C sensor. Similarly, the logic for generating the respective positive portions of the B and C-Phase currents could be represented as $\overline{A}B$ and $\overline{B}C$ respectively while the logic for generating the respective negative portions of the B and C-Phase currents could be represented as $A\overline{B}$ and $B\overline{C}$, respectively. It will be appreciated that the foregoing logic is merely illustrative being that other logical rules may be used to achieve a relative difference of about 60 electrical degrees between the cycle-condition mode of FIG. 2 and the cycle-conduction mode discussed below in the context of FIG. 3.

Figure 3:
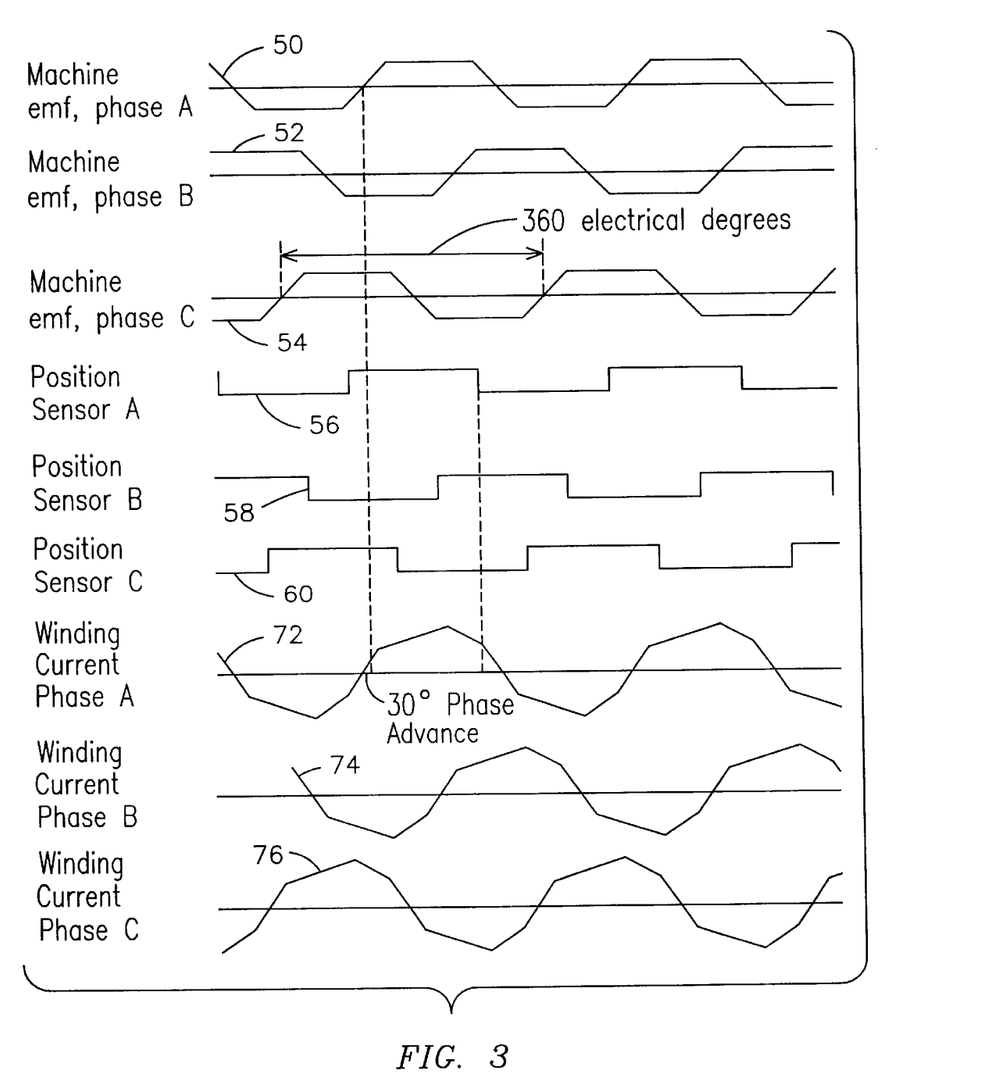
FIG. 3 illustrates exemplary signal plots corresponding to a second cycle-conduction angle (e.g., 180°) for operating the machine after reaching a predefined machine speed.

FIG. 3 illustrates exemplary machine current signals 72, 74 and 76 corresponding to a cycle-conduction angle of about 180 degrees including an exemplary lead angle of 30 electrical degrees relative to the zero crossing of the EMF signals. This mode of operation generally results in more sinusoidal phase currents and better lends itself to phase advance. Machines driven with 180 degree excitation generally have a lower torque per amp ratio than those with 120 degree excitation, and consequently have a higher no-load speed. The logic for the inverter control signals for a given phase are generally directly related to the position sensor state corresponding to that phase for 180 degree conduction. For example, when the state of the A-Phase position sensor is high, the upper switching device for phase A is energized. Conversely, when the state of the A-Phase position sensor is low, the lower switching device for phase A is energized and the upper switching device would be deenergized. Similarly, when the state of the B-Phase position sensor is high, the upper switching device for phase B is energized and when the state of the B-Phase position sensor is low, the lower switching device for phase B is energized and the upper switching device would be deenergized. A similar logic would apply to the switching devices for phase C.

It will be appreciated in FIGS. 2 and 3 that the respective position sensor signals are set to trigger 30 electrical degrees before the zero crossing of the corresponding phase EMF voltages. With the above-described logic for 120 degree conduction, each phase current is energized 30 electrical degrees after the EMF zero crossing. By way of comparison, for 180 degree conduction, the position sensors would typically be set to trigger at the zero crossing of the phase EMF. Once again it will be appreciated that such arrangement is merely illustrative and should not be construed as a design constraint since the position sensors could be arranged to trigger at other angles relative to the zero-crossing or at the zero-crossings of the EMF voltage signals. As suggested above, the logical rules for combining the stream of pulses from the sensor assembly would be modified in straighforward manner to reflect any such arrangement. One may note in FIG. 3 that the phase advance or lead provided in the sinusoidal currents relative to the zero crossings of the EMF signals effectively reduces the net average value of the product of EMF voltage and current, as compared to the net average value of the product of EMF voltage and current, in the absence of any phase advance. The phase lead effectively introduces a current portion having a negative value and this reduces the net average value of the product of EMF voltage and current. Once again, since the amount of torque produced by the machine is directly proportional to the product of EMF voltage and current, it will be appreciated from the phase and magnitude interrelationship of the exemplary voltage and current signals illustrated in FIG. 3 as to why the 180 degree conduction mode with a phase advance generally results in a relatively lower torque/amp ratio and higher no-load speed as compared to both the 120 degree conduction and the 180 degree conduction without any lead. This can be also appreciated in the machine speed/torque plots illustrated in FIG. 5.

FIG. 4 illustrates an exemplary system 100 for controlling a synchronous machine 101 including a polyphase stator. As suggested above, in one embodiment the machine is used in a piece of equipment, such as vehicle, both as a generator and as a motor for starting an engine in the piece of equipment. In this embodiment, the machine 101 may comprise a "Lundell" type wound-field synchronous machine. As will be readily understood by those skilled in the art, the Lundell machine operates on the principle of variable reluctance. The varying reluctance, as a function of rotor position, is achieved by means of its rotor design. See textbook titled "Electromechanics and Electric Machines" by S. A. Nasar and L. E. Unnewehr, published in 1979 by John Wiley & Sons, Inc., at section 1.1, for general background information regarding principal classes of rotating machine.

As shown in FIG. 4, the system 100 includes a sensor assembly 102 configured to supply a respective stream of pulses indicative of rotor position relative to each phase of the machine. A processor 106 is configured to process each stream of pulses from the sensor assembly 102 to generate a first set of inverter control signals. An inverter circuit 104 is coupled to receive the first set of inverter control signals and energize the respective phases of the stator to start the machine.

As discussed in the context of FIGS. 2 and 3, the first set of control signals is configured to provide a first cycle-conduction angle (e.g., about 120 electrical degrees) relative to the zero-crossings of the respective phase EMF voltages of the machine to produce a sufficiently high level of torque during start up of the machine. A first logic module 108 is configured to execute a first set of logical rules for selectively combining the stream of pulses from the sensor assembly 102 to provide the cycle-conduction angle based on the first set of control signals.

Upon the rotor reaching a predefined rotor speed value, such as may be determined by a comparator 112 by comparing a signal $\omega_r$ indicative of rotor speed to the predefined rotor speed value, as may be stored in a memory device 114, the processor is configured to process each stream of pulses from the sensor assembly 102 to generate a second set of inverter control signals. The rotor speed may be calculated by clocking the pulse width duration of the respective stream of pulses from sensor assembly 102, without having to add any separate speed sensor component. The second set of control signals is configured to provide a second cycle-conduction angle (e.g., 180 electrical degrees) relative to the zero-crossings of the respective phase EMF voltages of the machine to enable a sufficiently high rotor speed and thus facilitate the occurrence of a successful cranking event for the engine of the piece of equipment. A second logic module 110 is configured to execute a second set of logical rules for selectively combining the stream of pulses from the sensor assembly to provide the cycle-conduction angle based on the second set of control signals. In general, the cycle-conduction angle enabled by the second set of inverter control signals exceeds the conduction angle enabled by the first set of inverter control signals by a factor of $$\frac{n}{n-1},$$

wherein n is an integer number corresponding to the number of phases of the polyphase machine. That is, n is not allowed to be equal to one. For example, in the case of a three-phase machine, this factor is equal to 3/2 and assuming the second cycle-conduction angle is 180 degrees, the first cycle-conduction angle would correspond to 120 degrees. In the case of a five-phase machine, this factor is equal to 5/4 and assuming the second cycle-conduction angle is 180 degrees, the first cycle-conduction angle would correspond to 144 degrees. Similarly, in the case of a two-phase machine, this factor is equal to two and assuming the second cycle-conduction angle is 180 degrees, the first cycle-conduction angle would correspond to 90 degrees.

Figure 5:
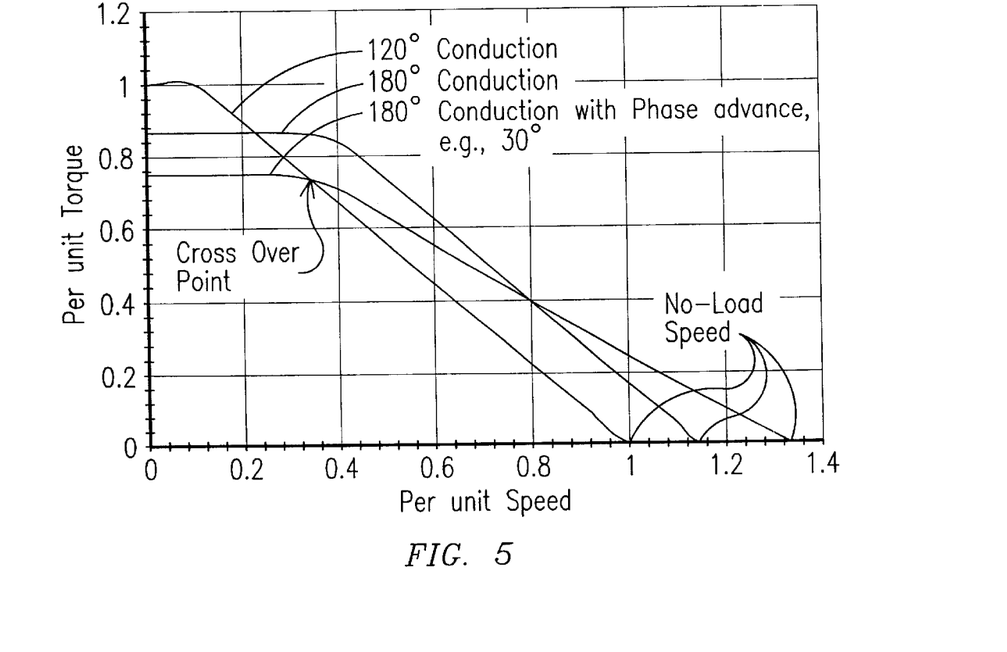
FIG. 5 illustrates exemplary machine speed/torque plots as a function of cycle-conduction angle.

FIG. 5 illustrates exemplary machine speed/torque plots as a function of cycle-conduction angle. As suggested above, the plot corresponding to 120 degree conduction has a higher torque per amp ratio than the plots corresponding to 180° degree conduction including some lead or advance angle (e.g., about 30 degrees) exhibit a higher no-load speed than both the plots corresponding to 120 degree conduction and 180 degree conduction with no phase advance. It will be appreciated, however, that the present invention is not limited to any specific phase advance value being that in some applications one may be able to quickly overcome the engine load torque thoughout the cranking speed range without having to provide any phase advance.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is Claimed is:

1. A method for controlling a synchronous machine including a polyphase stator, said method comprising:
   sensing rotor position of the machine using a sensor assembly configured to supply a respective stream of pulses indicative of rotor position relative to each phase of the machine;
   processing each stream of pulses from the sensor assembly to generate a first set of inverter control signals;
   applying the first set of inverter control signals to an inverter circuit coupled to energize the phases of the stator to start the machine, the first set of control signals being configured to provide a first cycle-conduction angle relative to the zero-crossings of the respective phase EMF voltages of the machine to produce a sufficiently high level of torque during start of the machine;
   upon the rotor reaching a predefined rotor speed value, processing each stream of pulses from the sensor assembly to generate a second set of inverter control signals; and
   applying the second set of inverter control signals to the inverter circuit to energize the phases of the stator, the second set of control signals being configured to provide a second cycle-conduction angle relative to the zero-crossings of the respective phase EMF voltages of the machine to produce a sufficiently high rotor speed, wherein each phase current enabled by the second set of inverter control signals leads by a respective angle the zero-crossings of the corresponding phase EMF voltages.

2. The method of claim 1 wherein the machine is used in a piece of equipment as a motor for starting an engine in the piece of equipment, and further wherein switching from the first cycle-conduction angle, that produces a sufficiently high level of torque during start of the machine, to the second cycle-conduction angle, that produces a sufficiently high rotor speed, facilitates the occurrence of a successful cranking event for the engine of the piece of equipment.

3. The method of claim 1 wherein the second cycle-conduction angle exceeds the first cycle-conduction angle by a factor of $$\frac{n}{n-1},$$

wherein n is an integer number corresponding to the number of phases of the machine.

4. The method of claim 1 wherein the sensor assembly comprises at least one sensor per stator phase selected from the group comprising Hall-effect, magneto-resistive, and optical sensors.

5. The method of claim 3 wherein the cycle-conduction angle provided by the first set of inverter control signals corresponds to about 120 degrees and the cycle-conduction angle provided by the second set of inverter control signals corresponds to about 180 degrees.

6. A system for controlling a synchronous machine including a polyphase stator, said system comprising:
   a sensor assembly configured to supply a respective stream of pulses indicative of rotor position relative to each phase of the machine;
   a processor configured to process each stream of pulses from the sensor assembly to generate a first set of inverter control signals;
   an inverter circuit coupled to receive the first set of inverter control signals and energize the respective phases of the stator to start the machine, the first set of control signals being configured to provide a first cycle-conduction angle relative to the zero-crossings of the respective phase EMF voltages of the machine to produce a sufficiently high level of torque during start of the machine; and
   upon the rotor reaching a predefined rotor speed value, the processor configured to process each stream of pulses from the sensor assembly to generate a second set of inverter control signals, the second set of control signals being configured to provide a second cycle-conduction angle relative to the zero-crossings of the respective phase EMF voltages of the machine to enable a sufficiently high rotor speed, wherein each phase current enabled by the second set of inverter control signals leads by a respective angle the zero-crossings of the corresponding phase EME voltages.

7. The system of claim 6 wherein the machine is used in a piece of equipment as a motor for starting an engine in the piece of equipment, and further wherein switching from the first cycle-conduction angle, that produces a sufficiently high level of torque during start of the machine, to the second cycle-conduction angle, that produces a sufficiently high rotor speed, facilitates the occurrence of a successful cranking event for the engine of the piece of equipment.

8. The system of claim 6 wherein the second cycle-conduction angle exceeds the first cycle-conduction angle by a factor of $$\frac{n}{n-1},$$

wherein n is an integer number corresponding to the number of phases of the machine.

9. Amended) The system of claim 6 wherein the sensor assembly comprises at least one sensor per stator phase selected from the group comprising Hall-effect, magneto-resistive, and optical sensors.

10. The system of claim 6 the cycle-conduction angle provided by the first set of inverter control signals corresponds to about 120 degrees and the cycle-conduction angle provided by the second set of inverter control signals corresponds to about 180 degrees.

11. The system of claim 6 wherein the machine comprises a Lundell wound-field synchronous machine.

12. A method for controlling a synchronous machine including a polyphase stator, said method comprising:

sensing rotor position of the machine using a sensor assembly configured to supply a respective stream of pulses indicative of rotor position relative to each phase of the machine;

processing each stream of pulses from the sensor assembly to generate a first set of inverter control signals, wherein the processing of the first set of control signals comprises coupling a first logic module to the sensor assembly to receive each stream of pulses, the logic module configured to execute a first set of logical rules for selectively combining the stream of pulses to provide the cycle-conduction angle of the first set of control signals wherein the combining of the stream of pulses includes maskingly combining respective pulses corresponding to rotor position from one phase of the machine with respective pulses corresponding to rotor position of another phase of the machine;

applying the first set of inverter control signals to an inverter circuit coupled to energize the phases of the stator to start the machine, the first set of control signals being configured to provide a first cycle-conduction angle relative to the zero-crossings of the respective phase EMF voltages of the machine to produce a sufficiently high level of torque during start of the machine;

upon the rotor reaching a predefined rotor speed value, processing each stream of pulses from the sensor assembly to generate a second set of inverter control signals; and applying the second set of inverter control signals to the inverter circuit to energize the phases of the stator, the second set of control signals being configured to provide a second cycle-conduction angle relative to the zero-crossings of the respective phase EMF voltages of the machine to produce a sufficiently high rotor speed.

13. A method for controlling a synchronous machine including a polyphase stator, said method comprising:

sensing rotor position of the machine using a sensor assembly configured to supply a respective stream of pulses indicative of rotor position relative to each phase of the machine;

processing each stream of pulses from the sensor assembly to generate a first set of inverter control signals;

applying the first set of inverter control signals to an inverter circuit coupled to energize the phases of the stator to start the machine, the first set of control signals being configured to provide a first cycle-conduction angle relative to the zero-crossings of the respective phase EMF voltages of the machine to produce a sufficiently high level of torque during start of the machine;

upon the rotor reaching a predefined rotor speed value, processing each stream of pulses from the sensor assembly to generate a second set of inverter control signals, wherein the processing of the second set of inverter control signals comprises coupling a second logic module to the sensor assembly to receive each stream of pulses, the logic module configured to execute a second set of logical rules for selectively combining the stream of pulses to provide the cycle-conduction angle of the second set of control signals wherein the combining of the stream of pulses includes assigning respective pulse states corresponding to rotor position from a respective phase of the machine to respective inverter control signal states that control energization of that phase; and applying the second set of inverter control signals to the inverter circuit to energize the phases of the stator, the second set of control signals being configured to provide a second cycle-conduction angle relative to the zero-crossings of the respective phase EMF voltages of the machine to produce a sufficiently high rotor speed.

14. A method for controlling a synchronous machine including a polyphase stator, said method comprising:

sensing rotor position of the machine using a sensor assembly configured to supply a respective stream of pulses indicative of rotor position relative to each phase of the machine;

processing each stream of pulses from the sensor assembly to generate a first set of inverter control signals;

applying the first set of inverter control signals to an inverter circuit coupled to energize the phases of the stator to start the machine, the first set of control signals being configured to provide a first cycle-conduction angle relative to the zero-crossings of the respective phase EMF voltages of the machine to produce a sufficiently high level of torque during start of the machine;

upon the rotor reaching a predefined rotor speed value, processing each stream of pulses from the sensor assembly to generate a second set of inverter control signals; and applying the second set of inverter control signals to the inverter circuit to energize the phases of the stator, the second set of control signals being configured to provide a second cycle-conduction angle relative to the zero-crossings of the respective phase EMF voltages of the machine to produce a sufficiently high rotor speed, wherein each phase voltage enabled by the second set of inverter control signals leads by a respective angle the zero-crossings of the corresponding phase EMF voltages wherein the respective lead angle comprises about 30 degrees.

15. A system for controlling a synchronous machine including a polyphase stator, said system comprising:

a sensor assembly configured to supply a respective stream of pulses indicative of rotor position relative to each phase of the machine;

a processor configured to process each stream of pulses from the sensor assembly to generate a first set of inverter control signals, wherein the processor includes a first logic module configured to execute a first set of logical rules for selectively combining the stream of pulses from the sensor assembly to provide the cycle-conduction angle of the first set of control signals, and further wherein the first set of logical rules for combining the stream of pulses comprises maskingly combining respective pulses corresponding to rotor position from one phase of the machine with respective pulses corresponding to rotor position of another phase of the machine;

an inverter circuit coupled to receive the first set of inverter control signals and energize the respective phases of the stator to start the machine, the first set of control signals being configured to provide a first cycle-conduction angle relative to the zero-crossings of the respective phase EMF voltages of the machine to produce a sufficiently high level of torque during start of the machine; and upon the rotor reaching a predefined rotor speed value, the processor configured to process each stream of pulses from the sensor assembly to generate a second set of inverter control signals, the second set of control signals being configured to provide a second cycle-conduction angle relative to the zero-crossings of the respective phase EMF voltages of the machine to enable a sufficiently high rotor speed.

16. A system for controlling a synchronous machine including a polyphase stator, said system comprising:

a sensor assembly configured to supply a respective stream of pulses indicative of rotor position relative to each phase of the machine;

a processor configured to process each stream of pulses from the sensor assembly to generate a first set of inverter control signals;

an inverter circuit coupled to receive the first set of inverter control signals and energize the respective phases of the stator to start the machine, the first set of control signals being configured to provide a first cycle-conduction angle relative to the zero-crossings of the respective phase EMF voltages of the machine to produce a sufficiently high level of torque during start of the machine; and upon the rotor reaching a predefined rotor speed value, the processor configured to process each stream of pulses from the sensor assembly to generate a second set of inverter control signals, wherein the processor includes a second logic module configured to execute a second set of logical rules for selectively combining the stream of pulses from the sensor assembly to provide the cycle-conduction angle of the second set of control signals, and further wherein the second set of logical rules for combining the stream of pulses comprises assigning respective pulse states corresponding to rotor position from a respective phase of the machine to respective inverter control signal states that control energization of that phase, the second set of control signals being configured to provide a second cycle-conduction angle relative to the zero-crossings of the respective phase EMF voltages of the machine to enable a sufficiently high rotor speed.

17. A system for controlling a synchronous machine including a polyphase stator, said system comprising:

a sensor assembly configured to supply a respective stream of pulses indicative of rotor position relative to each phase of the machine;

a processor configured to process each stream of pulses from the sensor assembly to generate a first set of inverter control signals;

an inverter circuit coupled to receive the first set of inverter control signals and energize the respective phases of the stator to start the machine, the first set of control signals being configured to provide a first cycle-conduction angle relative to the zero-crossings of the respective phase EMF voltages of the machine to produce a sufficiently high level of torque during start of the machine; and upon the rotor reaching a predefined rotor speed value, the processor configured to process each stream of pulses from the sensor assembly to generate a second set of inverter control signals, the second set of control signals being configured to provide a second cycle-conduction angle relative to the zero-crossings of the respective phase EMF voltages of the machine to enable a sufficiently high rotor speed, wherein each phase current enabled by the second set of inverter control signals leads by a respective angle the zero-crossings of the corresponding phase EMF voltages, and further wherein the respective lead angle comprises about 30 degrees.

* * * * *